O. Richardson.
Cotton-Seed Planter.
No. 72907.  Patented Dec. 31, 1867.
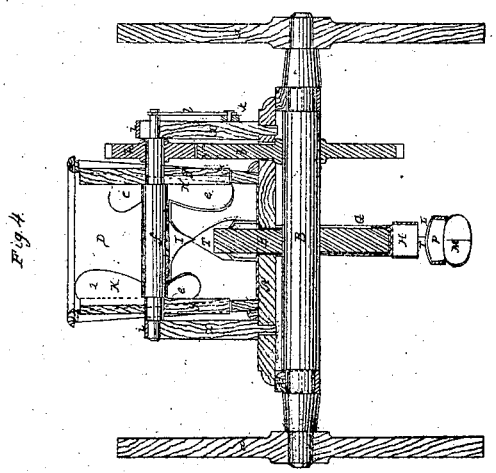
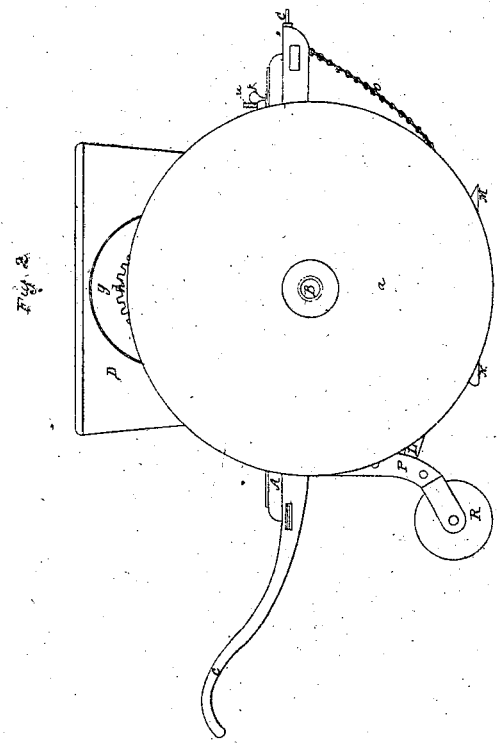
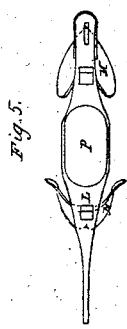
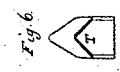
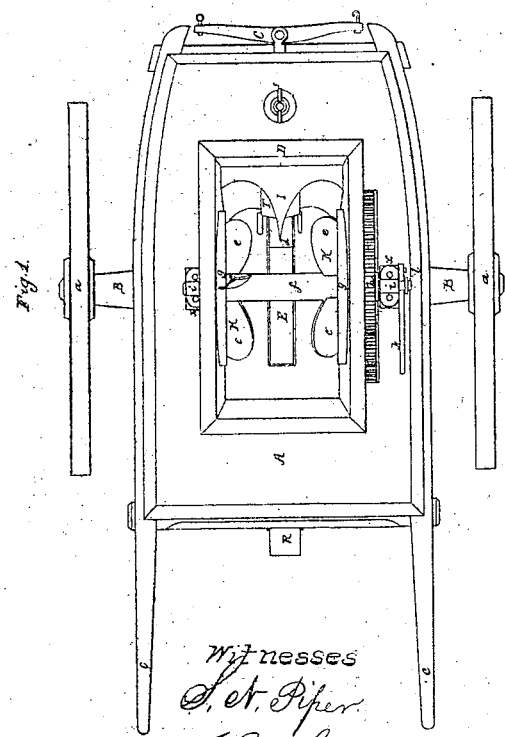
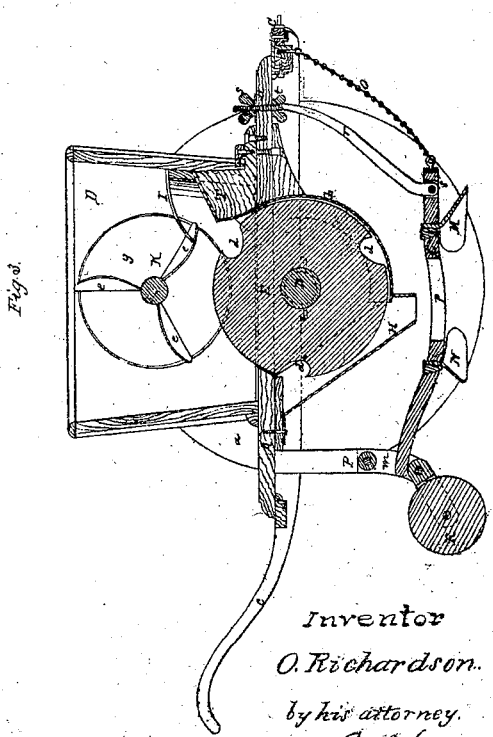
Witnesses
S. N. Piper
J. R. Snow
Inventor
O. Richardson
by his attorney
R. H. Eddy

United States Patent Office.

OLIVER RICHARDSON, OF BOSTON, MASSACHUSETTS.

Letters Patent No. 72,907, dated December 31, 1867.

IMPROVEMENT IN COTTON-SEED PLANTERS.

*The Schedule referred to in these Letters Patent and making part of the same.*

TO ALL PERSONS TO WHOM THESE PRESENTS MAY COME:

Be it known that I, OLIVER RICHARDSON, of Boston, in the county of Suffolk, and State of Massachusetts, have made a new and useful Invention having Reference to the Planting of Cotton-Seed; and I do hereby declare the same to be fully described in the following specification, and represented in the accompanying drawings, of which—

Figure 1 denotes a top view,
Figure 2 a side elevation,
Figure 3 a longitudinal and vertical section, and
Figure 4 a transverse section of it.
Figure 5 is a top view of its furrow-opener and coverer, with their frame.

The said machine is designed for the planting of cotton-seed "to a stand," or, in other words, in quantities at regular distances apart.

Owing to the furze or filaments usually projecting from cotton-seeds, they become bunched, or so connected together as to render it difficult, if not impossible to plant them, by most if not all ordinary seed-planters used for the planting of other kinds of seeds. With my improved planting-machine, cotton-seed can be planted to great advantage, and, as planters, in common parlance, say, "to a stand."

In the drawings, A denotes a platform or carriage-body, supported by an axle, B, provided with two wheels, $a\ a$. These wheels are to be fixed to and revolve with such axle, and there is a gear, $b$, also fixed on such axle, such gear being extended up through an opening in the carriage-body. The said carriage-body, at its front end, has a whiffle-tree, C, connected to it, and from the rear end of such body a pair of handles, $c\ c$, extend, in manner as exhibited. Furthermore, on the carriage-body is a hopper, D. A wheel, E, fixed on the axle, extends up into the hopper, in manner as shown in fig. 3, such wheel having, in its periphery, one or more hook-shaped notches or recesses, $d$. A curved spout, G, opening out of the hopper, extends down therefrom, along the periphery of the wheel, and against the opposite sides of the wheel, and discharges into an inclined spout or shield, H, arranged with respect to the wheel, and extended from the carriage-body in manner as represented. Each spout is open at its lower extremity. From the front side of the hopper there extends an angular and curved projection, I, which operates in conjunction with two rotary agitators, K K, in causing the seed to properly enter and fill each notch of the wheel E, while such notch may be passing along and directly underneath the said projection. Each of the agitators consists of a series of blades or wings, $e\ e\ e$, projecting from a shaft, $f$, which goes horizontally through the hopper, such blades being arranged, and, in many respects, like those of a screw-propeller. They are also extended from a disk, $g$, fixed to the shaft, and arranged in a circular cavity made in the side of the hopper, there being two of such disks to the hopper. The purpose of each of the disks is, not only to aid in strengthening the blades of the agitator, but to move with them, and thereby save the friction and injury to the seeds which would otherwise result by the moving of seed between the blades, being moved against the sides of the hopper while such blades may be in revolution. The agitators, while in rotation within the hopper, stir up the seed and crowd it underneath the projection I, and against the periphery of the wheel. Thus, by the operations of the agitators and the said projection, the seed will be effectually forced into the receiving-cavity of the wheel, while it may be passing along underneath the projection. A double inclined cam or deflector, T, formed as represented in fig. 3, and also in front elevation in fig. 6, is arranged within the hopper, and underneath its projection I, and in front of the said dropping-wheel. This deflector co-operates with the agitators and the projection I, in directing the mass of seeds upon the wheel and into each of its orifices, while it may be passing toward and by the said deflector. A gear or pinion, $h$, fixed on the shaft of the two agitators, engages with the gear $b$, and will be revolved thereby. The shaft $f$ is supported in bearings $i\ i$, at the tops of two standards, $x\ x$, erected on the carriage-body. A lever, $k$, having its fulcrum extended from one of the said standards, is connected to the shaft $f$ by a link or connection-bar, $l$. By means of such lever and link the shaft may be forced upward, so as to throw the pinion $h$ out of engagement with the gear $b$, and thereby prevent the agitators from being revolved while it may not be desirable to drop seed from the hopper. Underneath the wheel E is an open frame, L, which supports a furrow-opener or plough-share, M, and a coverer, N. A chain, O, connects the front end of the frame L with that of the carriage-body.

The frame L, at its rear, extends into, and so as to play loosely up and down in, a vertical slot, m, made in a bracket or arm, P, which is extended down from the carriage-body, and supports a roller, R, arranged in rear of the coverer. There is also an elongated opening, p, through the frame L, and underneath the discharging-mouth of the dropping-wheel spout H, the seeds, after their discharge from such spout, being dropped through such opening, and into the furrow made in the earth by the ploughshare. Besides the chain O, the frame L is connected with the carriage-body by means of a curved rod, r, and two nuts, s t, screwed on the rod, such rod having a male screw, u, to receive such nuts. The screw of the rod passes up through the platform or carriage-body. One nut is arranged beneath the body, and the other is disposed on the top of such body, in manner as shown in fig. 3. The screw-rod and the nuts serve to enable a person to adjust the ploughshare for the formation of a furrow of any desirable depth within that of the share. By having the plough-frame free to swing vertically at its rear, the coverer is enabled to conform itself to and remain on the surface of the ground passed over by it, while the ploughshare may be in the act of forming a furrow. The frame L should be jointed to its adjusting-rod, in order to enable such frame to move upward on the joint-pin s', as a centre.

In the operation of the machine, while being drawn over the surface of a field by an animal attached to the whiffle-tree, a person to guide the machine having hold of the handles, the carriage-wheels will revolve and turn the axle, and thereby cause the seed-dropping wheel to revolve within the hopper. Masses of seed will be dropped from the hopper, at regular intervals apart, and into a furrow which will be made by the ploughshare during such advance of the machine. The earth thrown up in forming the furrow will subsequently be returned to the furrow by the coverer, and upon the seed, and will be rolled down by the roller. By making each notch of the seed-dropping wheel hook-shaped, as shown in fig. 3, it will take or catch upon and hold a mass of seed to good advantage, and prevent it from being jammed in the spout while passing through the latter.

What I claim as my invention in the above-described machine, is as follows:

1. I claim the combination and arrangement of the projection I, and the two rotary agitators K K, with the hopper and the seed-dropping wheel arranged therein as specified.

2. I also claim the arrangement and combination of the disks $g\ g$ with the two agitators K K, a series of blades, and their hopper.

3. I also claim the application of the ploughshare and coverer-supporter or frame, L, to the carriage-body, by means substantially as specified, whereby the adjustment of the ploughshare may be effected, and the coverer be free to play vertically, in manner as explained.

4. I also claim the formation of each of the notches or cavities, d, of the seed-dropping wheel E, hook-shaped, as represented, and to operate with the advance spout, and upon the seed, as specified.

5. I also claim the combination and arrangement of the deflector T with the hopper and seed-dropping wheel, the agitators, and the projection I, arranged in such hopper, as specified.

OLIVER RICHARDSON.

Witnesses:
R. H. EDDY,
SAMUEL N. PIPER.